United States Patent
Ruppert et al.

[11] Patent Number: 6,079,225
[45] Date of Patent: Jun. 27, 2000

[54] METHOD FOR THE PRODUCTION OF A QUARTZ GLASS BLANK AND APPARATUS SUITABLE THEREFOR

[75] Inventors: Klaus Ruppert, Maintal; Anton Steinkohl, Gründau, both of Germany

[73] Assignee: Heraeus Quarzglas GmbH & Co. KG, Hanau, Germany

[21] Appl. No.: 09/099,894

[22] Filed: Jun. 18, 1998

[30] Foreign Application Priority Data

Jun. 19, 1997 [DE] Germany .............................. 197 25 955

[51] Int. Cl.$^7$ .................................................. C03B 20/00
[52] U.S. Cl. .................. 65/17.2; 65/17.4; 65/414
[58] Field of Search .................... 65/17.2, 17.4, 65/414, 415, 416

[56] References Cited

U.S. PATENT DOCUMENTS

| | | | |
|---|---|---|---|
| 3,117,838 | 1/1964 | Sterling et al. | 23/182 |
| 3,698,936 | 10/1972 | Moltzan | 117/105.2 |
| 3,883,336 | 5/1975 | Randall | 65/17.4 |
| 4,414,164 | 11/1983 | Roba et al. | 264/1.2 |
| 4,436,765 | 3/1984 | Feng et al. | 427/74 |
| 4,610,892 | 9/1986 | Eisbrenner et al. | 427/27 |
| 5,108,665 | 4/1992 | Crooker et al. | 264/6 |
| 5,110,335 | 5/1992 | Miller et al. | 65/3.12 |
| 5,622,750 | 4/1997 | Kilian et al. | 427/163.2 |
| 5,788,730 | 8/1998 | Ruppert et al. | 65/17.4 |

FOREIGN PATENT DOCUMENTS 56-14438 2/1981 Japan .

*Primary Examiner*—Sean Vincent
*Attorney, Agent, or Firm*—Andrew L. Tiajoloff; Whitman Breed Abbott & Morgan LLP

[57] ABSTRACT

In a known method, a quartz glass preform is produced by supplying a glass-forming base material in liquid form to an injection nozzle of a multi-nozzle flame deposition burner, vaporizing or gasifying the liquid glass-forming base material in the deposition burner, mixing the vaporized or gasified glass-forming base material with a gas containing oxygen under creation of $SiO_2$ particles in a chemical reaction, deposition of the $SiO_2$ particles on a substrate under creation of a porous preform and sintering of the preform. In this method, expensive devices such as pumps and ultrasonic vaporizers are needed for the vaporization of the liquid glass-forming base material; in addition, these devices are subject to mechanical wear and chemical attack and furthermore, they require extensive maintenance and due to their size result in a great height of construction. In order to avoid these disadvantages, a method is proposed according to the invention wherein a gas for the creation of a mist is fed to the deposition burner for the vaporization or gasification of the glass-forming base material, resulting in the creation of a low pressure in the area of the injection nozzle orifice. In an apparatus suitable for implementing the method, a vaporizing device comprises a vaporizing nozzle for the supply of a vaporizing gas, said nozzle being located adjacent to the injection nozzle and having an opening which, as seen in the direction of travel of the vaporizing gas, extends in a plane behind the injection nozzle opening.

17 Claims, 3 Drawing Sheets

METHOD FOR THE PRODUCTION OF A QUARTZ GLASS BLANK AND APPARATUS SUITABLE THEREFOR

FIELD OF THE INVENTION

The invention relates to a method for the manufacture of a quartz glass blank by supplying a glass-forming base material in liquid form to an injection nozzle of a multi-nozzle flame deposition burner, vaporizing or atomizing of the liquid glass-forming base material in the deposition burner, mixing of the vaporized or atomized glass-forming base material with a gas containing oxygen under creation of $SiO_2$ particles in a chemical reaction, deposition of the $SiO_2$ particles on a substrate under creation of a porous preform and sintering of the preform.

Furthermore the invention relates to a device for implementing the method, comprising a deposition burner which has an injection nozzle for the supply of liquid glass-forming base material, a device for the vaporization or atomization of the glass-forming base material as well as a burner nozzle for the supply of fuel gases.

DESCRIPTION OF THE PRIOR ART

Such deposition method and a deposition burner for its implementation are known from U.S. Pat. No. 5,110,335. $SiO_2$ particles are deposited in layers on a rotating quartz glass rod for the fabrication of a preform from which optical fibers are drawn. The metallic flame hydrolysis burners used therein have a central bore which is connected with a storage tank containing $SiCl_4$. Liquid $SiCl_4$ is supplied from the storage tank to the central orifice. A pump is used for metering the $SiCl_4$ supply. The central bore is provided with an ultrasonic atomizer in the region of the burner orifice. The $SiCl_4$ is atomized to form a fine mist and reacts with oxygen in the burner flame to form $SiO_2$. To supply the energy required for this the central bore is provided with a coaxially arranged annular fuel gas jet which in turn is provided on two sides with two annular oxygen jets. The two-sided supply of oxygen to the fuel gas stream generates in the known method a cylinder-shaped flame. The apertures of the annular jets are in the same plane as the orifice of the central bore.

In the known method the supply and atomization of the liquid $SiO_4$ requires costly devices such as pumps and ultrasonic atomizers. These devices are subject to mechanical wear and to chemical attack by the liquid $SiO_4$ so that contamination is necessarily carried into the preform. In addition, ultrasonic atomizers are especially maintenance-intensive and due to their space requirements the resulting construction of the deposition burners is very tall.

The technical objective of the invention is to indicate a method which avoids these disadvantages and to provide an apparatus therefor.

As far as concerns the method, the objective is achieved according to the invention on the basis of the method described in the beginning in that a vaporizing gas is supplied to the deposition burner for the atomization or vaporization of the glass-forming base material which at the same time creates a low pressure in the region of the orifice of the injection nozzle.

"Atomization" is to be understood as the separation of the glass-forming base material into small droplets, "vaporization" is to be understood as the transformation of a liquid into a vapor or a gas.

SUMMARY OF THE INVENTION

In the method according to the invention the atomization or vaporization takes place by means of a vaporizing gas. No additional device is necessary for the atomization or vaporization of the liquid. There are no costs and maintenance expenses linked with such devices; moreover, contamination of the preform is avoided.

The liquid glass-forming base material is supplied through an injection nozzle of the multi-jet deposition burner. The injection nozzle can have an orifice of an annular or ring-shaped cross section. Said nozzle can also be formed by combining several individual nozzles arranged in a circle or ring relative to one another. The orifice of the injection nozzle is commonly located in or near the central axis of the deposition burner.

The vaporizing gas is supplied through a vaporizing nozzle of the multi-nozzle deposition burner. As in the case of the injection nozzle, the vaporizing nozzle can have a circular or ring-shaped orifice cross section or it can be combined from several individual nozzles arranged in ring-shaped or circular manner. The supply of the vaporizing gas through the vaporizing nozzle not only causes vaporization of the liquid glass-forming base material but also creates a low pressure in the region of the injection nozzle orifice. For this purpose it is common but not necessary to arrange the injection nozzle and the vaporizing nozzle in immediate vicinity of one another. A low pressure in the region of the injection nozzle orifice is created when the flow parameters in each nozzle are appropriately adjusted in relation to one another.

Due to the low pressure created at the injection nozzle orifice, the liquid glass-forming base material is suctioned from the injection nozzle. Therefore the method according to the invention requires no device for the creation of the necessary flow of glass-forming base material through the deposition burner. As a result, again there are no problems related to the expenses, maintenance and contamination inherent in such apparatus.

Of course, several deposition burners can also be employed simultaneously for the deposition of $SiO_2$ particles on the substrate.

It has been shown particularly useful to use as liquid glass-forming base material one of the following compounds: silicon tetrachloride ($SiCl_4$), germanium tetrachloride ($GeCl_4$), boron trichloride ($BCl_3$), titanium tetrachloride ($TiCl_4$), phosphorus oxychloride ($POCl_3$), or a mixture of these compounds. These glass-forming base materials are liquid at room temperature. Therefore no additional heating is necessary for liquefaction.

Preferred vaporization gases are gases containing oxygen, argon, helium and nitrogen.

The vaporization gas is advantageously supplied to the burner head through a ring-shaped vaporization nozzle coaxially enclosing the injection nozzle. In this way a particularly effective and homogenous vaporization or atomization is achieved, as well a radially symmetrical pressure distribution around the injection nozzle orifice.

In a particularly preferred manner of proceeding the supply of the glass-forming base material to the burner head is regulated by the low pressure generated in the region of the injection nozzle orifice. The liquid glass-forming base material is freely suctioned from the storage tank. Hereby the metering of the glass-forming base material takes place only within the deposition burner, due to the low pressure created by the flow of the vaporization gas.

The level of the low pressure applied determines the dosage of the glass-forming base material. In this method there is no need for additional regulation of the quantity of the glass-forming base material to be supplied to the deposition burner outside of said burner. This reduces costs, simplifies the deposition method, and removes possible sources of contamination.

As regards the apparatus for implementing the method according to the invention, the technical objective stated above, which is based on the apparatus described in the beginning, is achieved according to the invention in that the vaporizing device for the supply of a vaporizing gas comprises a vaporizing nozzle arranged adjacent to the injection nozzle and that the orifice of said vaporizing nozzle extends, as viewed in the direction of the vaporizing gas supply, in a plane behind the orifice of the injection nozzle.

A vaporizing nozzle is provided in the apparatus according to the invention for the vaporizing of the glass-forming base material. An ultrasonic vaporizer within the deposition burner, as in the case of the known apparatus described in the beginning, is not needed. The invention therefore allows a low construction height of the deposition burner. Furthermore, the design of the deposition burner with a vaporizing burner requires low material and work expenditures. The danger of contaminating the preform is low in the apparatus according to the invention.

The liquid glass-forming base material is supplied via the injection nozzle of the multi-nozzle deposition burner. The injection nozzle can exhibit an annular or ring-shaped orifice cross section. It can also be formed by combining several individual nozzles. Commonly the orifice of the injection nozzle is located in or near the center axis of the deposition burner.

The vaporizing nozzle of the multi-nozzle deposition burner can also exhibit an annular or ring-shaped orifice cross section or it can be composed of several individual nozzles. Injection nozzle and vaporizing nozzle are different components, spatially separate, of the apparatus according to the invention. The vaporizing nozzle is immediately adjacent or adjacent to the injection nozzle.

The nozzle orifice of the vaporizing nozzle extends in a plane behind the nozzle orifice of the injection nozzle as seen in the direction of the vaporizing gas supply. The separate nozzle orifices are thus not coplanar in relation to one another. The vaporizing nozzle extends higher than the injection nozzle. In this manner a low pressure can easily be created in the region of the injection nozzle orifice. The liquid glass-forming base material is suctioned by the low pressure. Additional devices to generate the necessary flow of the glass-forming base material are not needed.

The energy for the transformation of the glass-forming base material into $SiO_2$ particles is created by a chemical reaction of the fuel gas or gases in a reaction zone. Commonly the fuel gases are hydrogen or oxygen which are supplied to the reaction zone by two spatially separated nozzles.

It has been shown to be particularly advantageous to design the vaporizing nozzle substantially ring-shaped and to arrange it between the injection nozzle and the fuel gas nozzle whereby said injection nozzle coaxially encloses the injection nozzle. A particularly effective atomization or vaporization and a symmetrical pressure distribution around the injection nozzle is achieved by this device which is distinguished by its simple design.

In addition, the vaporizing nozzle prevents a premature contact between the liquid glass-forming base material and the fuel gas or gases because the vaporizing nozzle encloses the orifice of the injection nozzle. The region between the injection nozzle orifice and the vaporizing nozzle orifice is therefore available for further atomization of the glass-forming base material.

It has been shown to be advantageous that the distance between the injection nozzle orifice and the vaporizing nozzle orifice be at least 3 mm. This distance not only permits the creation of an adequate low pressure in the injection nozzle orifice area but also assures a homogenous atomization of the glass-forming base material.

In a preferred embodiment of the apparatus according to the invention the cross section of the vaporizing nozzle widens as seen in the direction of the vaporizing glass supply, in a region below its nozzle orifice. The widening of the nozzle cross section has an effect on the vaporizing gas similar to that of a diffusor. This facilitates the creation of turbulent streams in this region and makes possible a very low pressure in the area of the injection nozzle. The turbulent stream can additionally contribute to the atomization or vaporization of the glass-forming base material. The widened aperture cross section region is commonly located approximately at the level of the injection nozzle orifice.

In another preferred variation of the apparatus according to the invention the vaporizing nozzle is designed as a venturi jet. This nozzle shape permits setting the velocity of the vaporizing gas particularly high in the region of the injection nozzle orifice. For this the nozzle section with the smallest aperture cross section is commonly arranged at the level of the injection nozzle orifice. The cross section of the venturi jet increases in the direction of the nozzle orifice. This results in a rapid decrease of gas pressure so that vaporization or gasification of the liquid glass-forming base material is made possible.

One embodiment of the apparatus according to the invention has been shown particularly valuable as regards good mixing of the vaporized or atomized glass-forming base material with the fuel gas, wherein the orifice of the fuel gas nozzle, as seen in the direction of the vaporizing gas supply, is arranged before the opening of the vaporizing nozzle. This results in an improved mixing of the glass-forming base material with the fuel gas or with the fuel gases. In this embodiment of the invention the distance between the burner and the surface of the substrate or of the preform being formed can be kept especially small.

One embodiment of the invention according to the invention has been shown to be especially valuable, where the fuel gas nozzle is made longer in relation to the vaporizing nozzle as seen in the direction of the vaporizing gas supply. The extension causes a homogenous atomization or vaporization of the glass-forming base material before contact with the fuel gas or gases. Here, the distance of the vaporizing nozzle and fuel gas nozzle orifices is set at between 3 and 5 mm. In addition, it can be advantageous to expand the cross section of the fuel gas nozzle in an area below the nozzle orifice. The enlargement of the orifice cross section has an effect similar to that of a diffusor. In this way a creation of turbulent streams in this area is facilitated and the mixing of the fuel gas with the vaporized or atomized glass-forming base material is improved. The region with the enlarged orifice cross section commonly lies at about the level of the vaporizing nozzle orifice.

As concerns low contamination of the preform, a device is particularly distinguished, where the deposition burner head consists entirely of quartz glass. Supply lines and connecting parts linked with the deposition burner can be made for example of stainless steel or plastics. A multi-nozzle deposition burner made of quartz glass can be manufactured relatively easily.

BRIEF DESCRIPTION OF THE DRAWINGS

The invention will be explained in more detail by way of examples and patent drawings. In the drawings there are shown individually, in schematic depiction, in FIG. 1, a first embodiment of a deposition burner, in particular suitable for atomization of liquid glass-forming base material, in FIG. 2, a further embodiment of a deposition burner, in particular for vaporization of liquid glass-forming base material, and in FIG. 3, a further embodiment of a deposition burner according to the invention.

DETAILED DESCRIPTION

Figure 1:
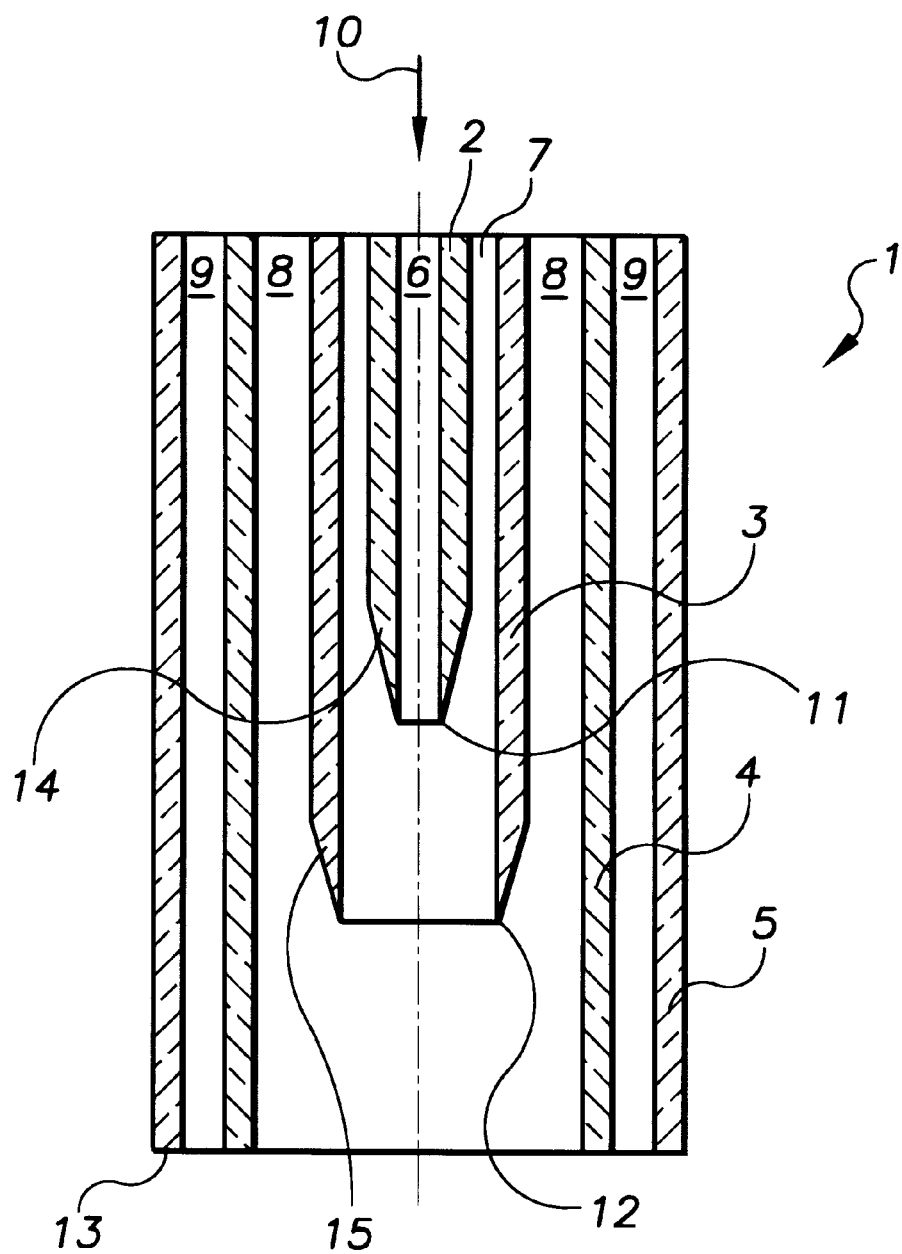

FIG. 1 shows a part of a burner head in a deposition burner which as a whole has been designated 1. The burner head 1 is designed radially symmetrical along its longitudinal axis (broken line). It consists of a total of four quartz glass tubes 2, 3, 4, 5 arranged coaxially in relation to one another. The central tube 2 encloses an injection nozzle 6. Between the central tube 2 and the adjoining tube 3 is a vaporizing nozzle 7. Tubes 3, 4 enclose the ring nozzle 8, and the tubes 4 and 5 enclose the outer nozzle 9. The wall thickness of tubes 2, 3, 4, 5 is 2 mm.

Injection nozzle 6 whose cross section is designed annular, is connected with a tank for liquid $SiCl_4$ (not shown in FIG. 1). Oxygen is introduced into the vaporizing nozzle 7, which has a substantially ring-shaped cross section with an orifice width of about 1 mm, and hydrogen is introduced into the ring nozzle 8 which has an orifice width of about 3 mm. The outer nozzle 8, which is also ring-shaped in cross section and has an orifice of about 3 mm, is supplied with oxygen. The direction of supply is indicated by directional arrow 10.

The nozzle orifices of the individual nozzles 6, 7, 8, 9 are disposed in different planes as seen in the direction of supply 10. The nozzle orifice for the injection nozzle is assigned the inner plane 11. The nozzle orifices of the vaporizing nozzle 9 and the ring nozzle 8 extend in the central plane 12 and the nozzle orifice of the outer nozzle 9 lies in the outer plane 13.

The distance of the inner plane 11 from the central plane 12 is 3 mm. The central plane 12 and the outer plane 13 are 4 mm apart.

The free end of the inner quartz glass tube 2 narrows as seen in the direction of supply 10. The narrowing 14 extends over a distance of 10 mm up to the nozzle orifice for the injection nozzle (corresponding to the inner plane 11). Corresponding to the narrowing of the tube 2 the cross section of the vaporizing nozzle 7 widens in this region.

The free end of the quartz glass tube 3 also narrows as seen in the direction of supply 10. The narrowing 15 extends over a length of 10 mm as well, up to the central plane 12. In this way the cross section of the ring nozzle orifice widens in this region.

The method according to the invention will be explained in more detail below by way of the embodiment shown in FIG. 1.

Liquid $SiCl_4$ is fed through injection nozzle 6, oxygen is fed through the ring nozzle 8, and hydrogen is fed through the outer nozzle 9, whereby the ratios of the flow velocities of each stream of material are 5:1:2:15, following the order in which they are listed.

The oxygen fed through the vaporizing nozzle 7 is metered such that it carries along with it and atomizes the liquid $SiCl_4$ which emerges from the injection nozzle 6. The widening of the orifice cross section of the injection nozzle 7 contributes to this in that this increases the flow velocity of the vaporizing gas (oxygen) in the area below the nozzle opening (inner plane 11) and a turbulent flow is created.

Furthermore the flow of the vaporizing gas in the area of the injection nozzle orifice 7 (corresponding to the inner plane 11) creates a low pressure. Due to the low pressure $SiCl^4$ is suctioned from the injection nozzle 7. The metering of the suctioned amount of liquid is accomplished by means of the low pressure level. The latter in turn depends on the velocity of flow of the vaporizing gas. A sufficient low pressure is attained by moving the orifice of the vaporizing nozzle 7 forward as seen in the direction of supply 10, up to the central plane 12. Due to the outer limitation of the vaporizing gas flow, it is particularly effective in the region of the nozzle orifice of injection nozzle 6 and creates there the required low pressure.

Moreover, by the outer limitation of the vaporizing gas a premature contact with the fuel gas (hydrogen and oxygen) is prevented. The distance of about 3 mm between the two planes 11 and 12 serves to atomize the liquid $SiCl_4$ before the contact with hydrogen from the ring nozzle 8.

In addition, in this embodiment of the method according to the invention a further atomization is assured between the planes 12 and 13. This is so because in this area the quartz glass tube 4 forms an outer limitation which prevents contact with oxygen from the outer nozzle 9 and thus a chemical reaction with the hydrogen. This assures a particularly homogenous atomization and mixing of the liquid $SiCl_4$ before the hydrolysis reaction.

This is aided by the widening of the cross section of the ring nozzle 8 in the region below plane 12. The widening has the effect of a diffusor for the hydrogen stream, so that above this region a turbulent gas stream is created which leads to a better mixing of the gases and the atomized liquid.

Figure 2:
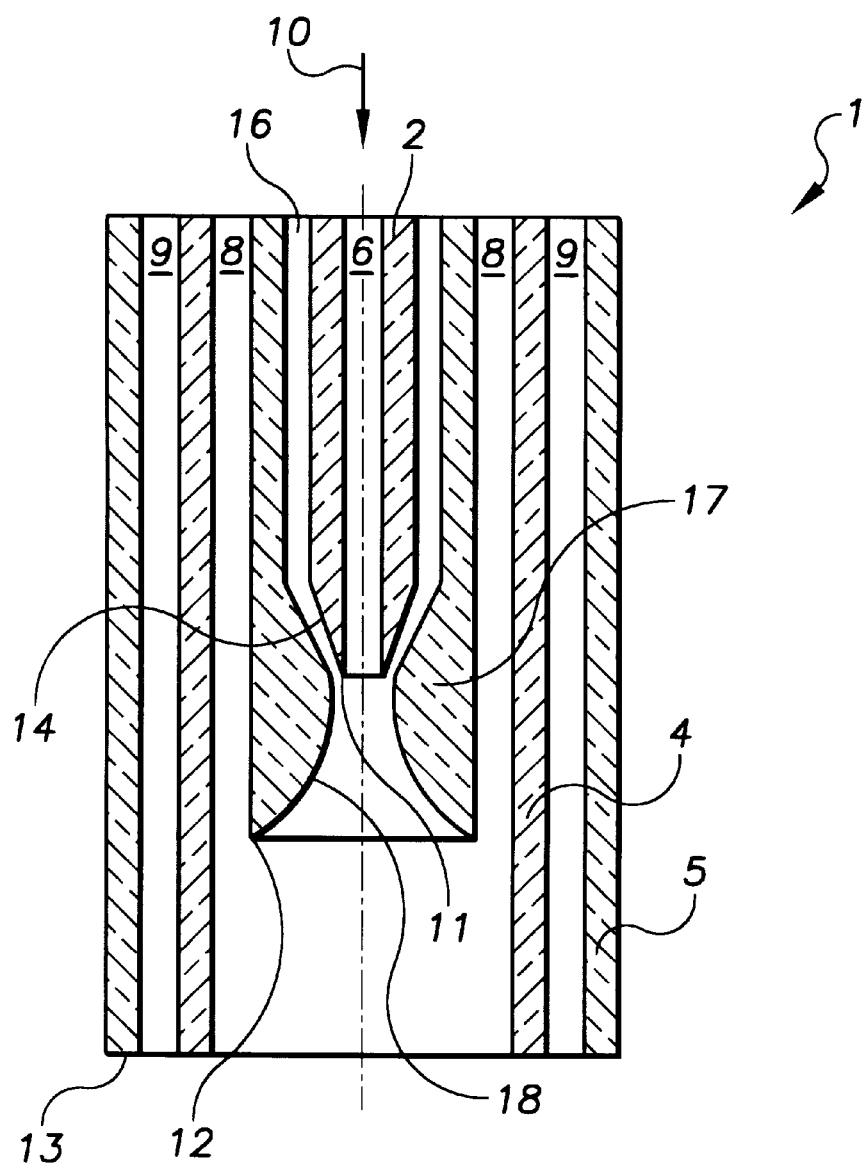
Figure 3:
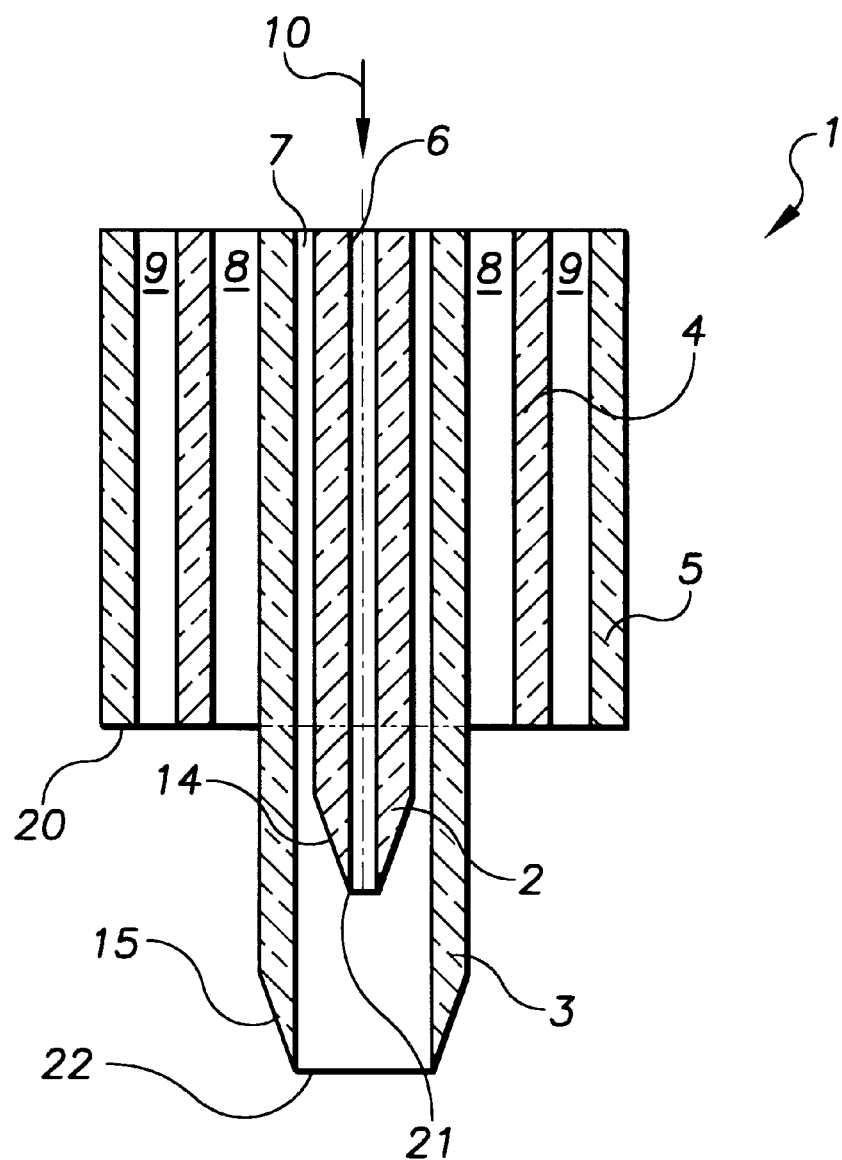

Insofar as in FIGS. 2 and 3 the same reference numbers are used in the drawings of additional embodiments of the apparatus according to the invention as in FIG. 1, these numbers refer to components and other elements of the burner head as were explained by way of FIG. 1 with the identical reference numbers.

In the burner head according to FIG. 2 the vaporizing nozzle is designed as a so-called "venturi jet" 16 which is delimited by the quartz tubes 2 and 17. Oxygen is used as the vaporizing gas. As seen in the direction of supply 10, the ring-shaped nozzle opening of the venturi jet 16 narrows below the nozzle orifice of the injection nozzle 2 (plane 11), while the nozzle orifice widens in region 18 above plane 11, i.e., above the opening of the injection nozzle 2 up to plane 12.

A powerful low pressure is generated in the region of the orifice of the injection nozzle 6 (plane 11) due to the special design of the venturi jet 16; said low pressure can lead to the gasification of the liquid $SiCl_4$. A particularly homogenous distribution of the glass-forming base material is achieved by the gasification. In other respects the apparatus according to FIG. 2 does not substantially differ from that according to FIG. 1. Therefore attention is directed to the above detailed explanations regarding the advantages and effects of the individual components of the burner head 1 and regarding the method according to the invention.

In the part of a burner head 1 shown in FIG. 3 the nozzle orifices of the ring nozzle 8 and the outer nozzle 9 extend in a common plane 20. The nozzle orifice of the injection nozzle 6 lies in the central plane 21 and the nozzle orifice of the vaporizing nozzle 7 lies in the outer plane 22.

Oxygen is used as the vaporizing gas and $SiCl_4$ is used as the glass-forming base material. The oxygen fed through the vaporizing nozzle 7 is metered such that it carries along the liquid mixture emerging from the injection nozzle 6 and atomizes it at the same time. The widening of the orifice cross section of the vaporizing nozzle 7 contributes to this in that it increases the flow velocity of the vaporizing gas (nitrogen) in the area below the injection nozzle orifice (inner plane 21) and a turbulent flow is created.

In addition, the flow of the vaporizing gas in the region of the orifice of the injection nozzle 7 (corresponding to the central plane 21) creates a low pressure. The quantity of the suctioned liquid is metered by means of the low pressure level. The latter in turn depends on the flow velocity of the vaporizing gas. A sufficient low pressure is attained by moving the orifice of the vaporizing nozzle 7 forward as seen in the direction of supply 10, up to the central plane 22. Due to the outer limitation of the vaporizing gas flow, it is particularly effective in the region of the nozzle orifice of injection nozzle 6 and creates there the required low pressure. The distance between the planes 21 and 22 is approximately 3 mm.

In this embodiment of the apparatus according to the invention the nozzle orifices of the fuel gas nozzles 8 and 9 for hydrogen and oxygen lie in the same plane 20 which is in front of the nozzle orifice of the vaporizing nozzle 7 (plane 22) as seen in the direction of supply 10. The distance between the planes 20 and 22 is approximately 5 mm. A mixing of, and a reaction between, oxygen and hydrogen takes place in the region between planes 20 and 22. As a result in the region around plane 22 there is reaction energy already available for the hydrolysis reaction of the atomized glass-forming base material so that in the case of this burner the reaction zone for the hydrolysis reaction starts relatively close to the burner aperture. This makes it possible to keep small the distance between the burner head 1 and the surface of the preform being created which can be of advantage in view of the deposition rate and efficiency.

What is claimed is:

1. A method for the production of a quartz glass blank, said method comprising:

supplying a glass-forming base material in liquid form to an injection nozzle of a multi-nozzle flame deposition burner, said injection nozzle having an orifice;

vaporizing or atomizing the liquid glass-forming base material in the deposition burner;

mixing of the vaporized or atomized glass-forming base material with a gas containing oxygen to create $SiO_2$ particles in a chemical reaction;

deposition of the $SiO_2$ particles on a substrate to create a porous preform; and sintering of the preform;

a vaporizing gas being fed to the deposition burner through a passage that widens to a larger flow cross-section adjacent the orifice of the injection nozzle, aiding in the vaporizing or atomizing of the glass-forming base material.

2. Method according to claim 1, wherein the liquid glass-forming base material is of one of, or a mixture of, the compounds of the group consisting of silicon tetrachloride ($SiCl_4$), germanium tetrachloride ($GeCl_4$), boron trichloride ($BCl_3$), titanium tetrachloride ($TiCl_4$), and phosphorus oxychloride ($POCl_3$).

3. Method according to claim 1, wherein the vaporizing gas contains oxygen, argon, helium or nitrogen.

4. Method according to claim 1, wherein the vaporizing gas is supplied to the deposition burner through a ring-shaped vaporizing nozzle which coaxially encloses the injection nozzle.

5. A method for the production of a quartz glass blank, said method comprising:

supplying a glass-forming base material in liquid form to an injection nozzle of a multi-nozzle flame deposition burner, said injection nozzle having an orifice;

vaporizing or atomizing the liquid glass-forming base material in the deposition burner;

mixing of the vaporized or atomized glass-forming base material with a gas containing oxygen to create $SiO_2$ particles in a chemical reaction;

deposition of the $SiO_2$ particles on a substrate to create a porous preform; and sintering of the preform;

a vaporizing gas being fed to the deposition burner so as to create a low pressure region adjacent the orifice of the injection nozzle which aids in the vaporizing or atomizing of the glass-forming base material, and wherein the supply of the glass forming base material to the deposition burner is regulated by means of low pressure generated in the region of orifice of the injection nozzle.

6. An apparatus for production of a quartz glass blank, said apparatus comprising:

a deposition burner having an injection nozzle having an orifice and supplying a liquid glass-forming base material therethrough;

a vaporizing device atomizing or vaporizing the glass-forming base material; and a fuel gas nozzle supplying fuel gases;

the vaporizing device comprising a vaporizing nozzle having an orifice and supplying a vaporizing gas in a direction therethrough, said vaporizing nozzle having an orifice and supplying a vaporizing gas in a direction therethrough, said vaporizing nozzle being arranged adjacent to the injection nozzle and the orifice of said vaporizing nozzle extending in a plane beyond the orifice of the injection nozzle in the direction of supply of the vaporizing gas.

7. Apparatus according to claim 6, wherein the vaporizing nozzle is substantially ring-shaped, arranged between the injection nozzle and the fuel gas nozzle, and coaxially encloses the injection nozzle.

8. Apparatus according to claim 7, wherein the distance between the orifices of the injection nozzle and the vaporizing nozzle is at least 3 mm.

9. Apparatus according to claim 6, wherein the cross section of the vaporizing nozzle widens in a region beginning below its orifice viewed from the direction of the supply of the vaporizing gas.

10. Apparatus according to claim 6, wherein the vaporizing nozzle is configured as a venturi jet.

11. Apparatus according to claim 6, wherein the fuel gas nozzle is extended, as compared with the vaporizing nozzle, as viewed in the supply direction of the vaporizing gas.

12. Apparatus according to claim 11, wherein the distance between the orifices of the vaporizing nozzle and fuel gas nozzle is between 3 and 5 mm.

13. Apparatus according to claim 6, wherein the orifice of the fuel gas nozzle is arranged before the orifice of the vaporizing nozzle in the supply direction of the vaporizing gas.

14. Apparatus according to claim 6, wherein the deposition burner comprises a burner head which is composed substantially entirely of quartz glass.

15. An apparatus for production of a quartz glass blank, said apparatus comprising:

an injection nozzle having an orifice through which a liquid glass-forming base material is supplied;

a vaporizing nozzle supplying a vaporizing gas, said vaporizing nozzle being configured so that the supply of said vaporizing gas through a passage in the vaporizing nozzle that widens to a larger flow cross-section adjacent the orifice of the injection nozzle, said glass-forming base material being atomized or vaporized by the vaporizing gas adjacent the orifice and intermixing therewith;

said vaporizing nozzle having an orifice out of which the atomized or vaporized glass-forming base material passes;

a fuel gas nozzle supplying a fuel gas adjacent the orifice of the vaporizing nozzle so that said fuel gas intermixes and burns with the atomized or vaporized glass-forming base material to form $SiO_2$ particles that deposit on a substrate to form a porous preform.

16. The apparatus of claim 15, and the vaporizing nozzle orifice being located beyond the injection nozzle orifice in the direction of supply of the base material.

17. The apparatus of claim 15, and said vaporizing nozzle coaxially surrounding said injection nozzle.

* * * * *